Patented July 8, 1941

2,248,104

UNITED STATES PATENT OFFICE 2,248,104

WELDING ROD

Louis G. Marini, Jr., Pittsburgh, and David F. Helm, York, Pa., assignors to The McKay Company, Pittsburgh, Pa., a corporation of Pennsylvania No Drawing. Application April 22, 1938, Serial No. 203,586

5 Claims. (Cl. 219—8)

The present invention relates to welding rods and more especially to coated welding rods. Electrodes for arc welding are now generally given a coating to fulfill certain functions. As is well known in the art, these coatings tend to stabilize the arc, form a refractory shield, furnish a favorable atmosphere as well as furnish a protective slag for the weld and to control the composition of the deposited metal. These coatings are made of finely ground materials, commonly including such materials as carbonates, silicates, refractory oxides, plus, frequently, powdered metals or alloys, and plus, frequently, carbonaceous material which decomposes or burns to furnish a protective atmosphere. These powdered materials are mixed with binders and are applied to the welding rod usually by an extruding or dipping process. Silicate of soda is the binder commonly employed. The sodium silicate, however, has certain disadvantages. Certain water-soluble materials are difficult to use with a sodium silicate binder. Materials which are incompatible with fluid sodium silicate cannot be used. Considerable time is taken for drying the water from the sodium silicate.

We have found that the use of certain water insoluble organic binders such as thermo-setting resin affords advantages both in the process of manufacture and in the completed product. The term thermo-setting resins is employed to define resins which react through polymerization or condensation to harden irreversibly upon the application of heat. The most common examples of such resins are the synthetic resins, such as those of phenol-aldehyde, urea-formaldehyde, etc. types. These resins may be employed in a liquid or in a dissolved form as a binder for the finely ground substances for the electrode coating. The resin, either pure or cut with a solvent, is mixed with the coating materials and the mixture applied to the welding rod, after which the resin is set by quick heating, preferably by passing the coated rods through a suitable heating apparatus or oven.

The mixture may be applied in a plastic state to the welding rod by an extruding operation, or a slurry may be made using a suitable solvent to thin or cut the resin and the welding rods dipped in the slurry. The mixture may be applied by any means found suitable for coating wire or rods either manual or automatic. The resin binder may be also used in a powdered state and the coating applied to the welding rod by the application of heat or pressure or both. In each case the binder is set by a heating operation.

The thermo-setting resin may be employed as the sole binding material, or other binding materials may be mixed with it, such for example as materials which harden upon the evaporation of a volatile solvent such as cellulosic derivatives dissolved in acetone or alcohols, or materials which harden by oxidation such as China-wood oil, or both.

Any suitable mixture of finely ground coating materials may be employed, according to well known formulae. When the thermo-setting resinous binder is used in place of sodium silicate, where desired, a sodium compound, such as dried sodium silicate or sodium bicarbonate, may be added as a source of sodium ion to act as an arc stabilizer. Materials other than the sodium compounds may be used to furnish suitable arc stabilizing ions. A greater latitude in the selection of the coating constituents is permitted than with a sodium silicate binder because constituents may be used which are highly water-soluble, which are incompatible in aqueous media, or which are incompatible with liquid sodium silicate. The thermo-setting resinous binders furnish carbonaceous material in a form very finely and intimately distributed with the inorganic materials to serve as a source of carbon to produce a protecting or reducing atmosphere. The thermo-setting resinous binders also give good adhesion to the welding rod, as well as considerable flexibility to the coating. The quick setting of these binders contributes to the rapid and economical manufacture of the coating welding rods.

The moisture content of the finished coating can be controlled more accurately than when water-soluble binders are employed. Also the moisture content of the coatings does not tend to vary as widely upon exposure to the atmosphere as do coatings having water-soluble binders.

While we have specifically described certain preferred embodiments of our invention, the invention is not so limited but may be otherwise embodied and practiced within the scope of the following claims.

We claim:

1. A welding rod having a coating bonded with a binder containing a heat-hardened thermo-setting resin.

2. A welding rod having a coating bonded with a binder consisting principally of a heat-hardened thermo-setting resin.

3. A welding rod having a coating bonded with a binder containing a heat-hardened thermo-setting resin of the class consisting of phenol-aldehyde and urea-formaldehyde resins.

4. A welding rod having a coating bonded with a binder consisting principally of the infusible reaction product resulting from the heat-hardening of a thermo-setting synthetic resin.

5. A welding rod having a coating bonded with a binder consisting principally of a heat-hardened phenol-aldehyde resin.

LOUIS G. MARINI, Jr.
DAVID F. HELM.